May 9, 1967 R. J. PERRONE ETAL 3,318,994
RETRACTILE CORD AND METHOD OF MAKING
Filed June 25, 1965
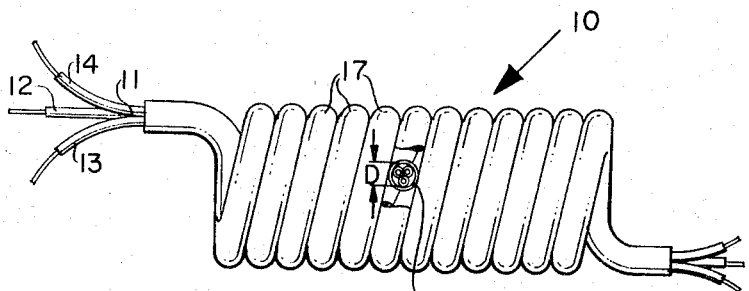
Fig. 1   16 - JACKET UNDER TENSION
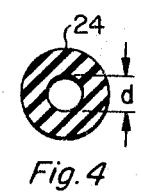
Fig. 4
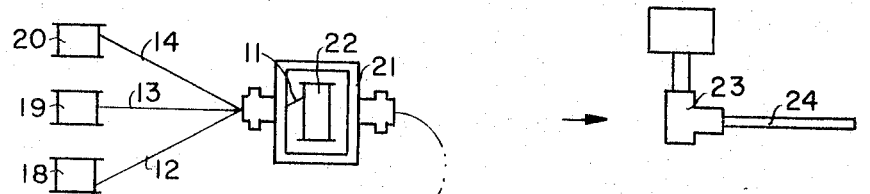
Fig. 2
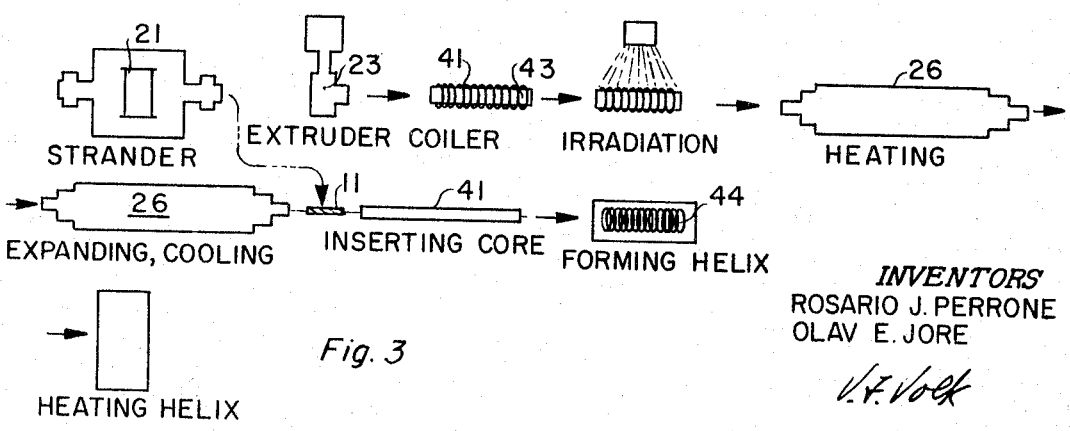
Fig. 3
INVENTORS
ROSARIO J. PERRONE
OLAV E. JORE
V.F. Volk
THEIR AGENT

United States Patent Office 3,318,994
Patented May 9, 1967

3,318,994
RETRACTILE CORD AND METHOD OF MAKING
Rosario J. Perrone and Olav E. Jore, Marion, Ind., assignors to Anaconda Wire and Cable Company, a corporation of Delaware
Filed June 25, 1965, Ser. No. 466,891
8 Claims. (Cl. 174—69)

Our invention relates to a retractile cord and particularly to retractile cord having a jacket comprised of shrinkable tubing.

It has long been known to make retractile cords, such as the cords used in telephone hand-sets, by covering a flexible core with a jacket comprised of a rubberlike or plastic composition that is capable of taking a permanent set when it is heated in the form of a helix. When the jacket is comprised of rubber or other thermosetting material the jacket is extruded over the core in the same way as jackets are extruded over non-retractile cords. The cord is then wound on a mandrel with the jacket stock in an uncured or partially cured condition and the mandrel is placed in a curing oven where the cord is heated until the jacket has set in the helical form. When the jacket is comprised of thermoplastic material, such as polyvinyl chloride, it is wound on a mandrel and heated as before but the reheating does not cure the jacket composition; it merely reforms it into the helical shape, and the cord must be thoroughly cooled before it is removed from the mandrel.

The known types of retractile cords require jackets of very substantial wall thickness since they do not make the most efficient use of the elastic properties of the jacket materials. Now we have invented a retractile cord structure and method of making a retractile cord that provides the necessary springiness to the helix with a much thinner wall thickness of jacket. This is a matter of particular importance for long cords or cords having particularly heavy cores such as vacuum cleaner cords and electric iron cords, where the thick jackets required for a satisfactory elastic recovery have prevented retractile cords from receiving general market acceptance.

Our retractile cord has a jacket comprised of shrinkable tubing that was originally extruded, or otherwise formed, to have a diameter smaller than the core diameter, with the result that the jacket is stretched and under hoop tension at all times. We have found that such a jacket need have only a fraction of the wall thickness of conventional jackets to achieve the same retractile properties as the latter. Our cord thus comprises a flexible core such as a core formed of one or more insulated conductors which may be twisted together. Alternately it may comprise other cores such as glass fiber or textile yarns. These may be used for the manufacture of retractile cords for key chains, eye-glass holders, dog chains, curtain holders, etc.

A tubular elastic jacket surrounds the core. This jacket has a diameter in its unstretched condition smaller than the diameter of the core and is under circumferential tension due to the stretching effect of the core. The cord is formed in the shape of a tight helix with a plurality of adjacent turns and will return to its original tight helical shape upon the release of any tensional force spreading apart the turns. This return is due to the tension in the jacket.

The jacket of our cord may comprise polyvinyl chloride, neoprene, silicone rubber blended with polyethylene or any other shrinkable material having suitable elasticity.

Our method of making our retractile cord comprises the steps of forming a flexible elongated core, and also forming a length of heat shrinkable elastic tubing with a bore diameter smaller than the diameter of the core. The tubing may be extruded of a material such as one comprising neoprene, or silicone rubber and polyethylene, but it is not limited to such extrusion. The jacket might also be formed by a latex deposition process such as is known for vinyl latices, by the fusion together of wrapped tapes, etc., within the scope of our invention. The tubing is expanded at an elevated temperature, such as, for a composition of neoprene, or silicone rubber and polyethylene, 125–175° C., to a diameter greater than the diameter of the core, and cooled while in the expanded condition. Subsequent to expanding the tubing, the core is inserted into it. This will usually be done after the tubing has been cooled, but may also be done before cooling while the tubing is mechanically held in the expanded condition. An apparatus for expanding shrinkable tubing suitable for use in our invention is described in Patent No. 3,182,355, assigned to the same assignee. Apparatus for manufacturing shrinkable tubing of indefinite length is described in Patent No. 2,716,777. The tubing containing the core is formed into a tight helix such as by winding it around a mandrel with the adjacent turns in contact. An alternative method is to confine the helix in a heating cylinder having an internal diameter equal to the external diameter of the helix. This has the advantage that there is no flattening of the tubing on the inside surface of the helix, and that the outer appearance of the final cord is less likely to have ony folds or wrinkles develop during the shrinking step. The helix formed from the tubing is then heated to about the same temperature as that at which the tubing was expanded. For the silicone rubber-polyethylene the shrinking temperature will preferably be 120–150° C. for at least three minutes.

We have found, surprisingly, that the partial shrinkage of the jacket upon the core while it is in a helical shape suffices to set the cord permanently into that shape. It is, however, within the scope of our invention, although it requires an extra operation, to form the tubing into a helix at its original small diameter so that it will tend to return to this shape when the heat is applied to shrink it. It is known that shrinkable polyethylene tubing can be made by irradiating polyethylene tubing with beta rays. When irradiated polyethylene material is used in the practice of our invention it is advantageous to form the tubing into a tight helix before it is expanded and to irradiate the helix with beta rays so as to induce a so-called "plastic memory." The tubing is subsequently straightened and expanded at an elevated temperature, and cooled in the expanded condition. The core is inserted into the expanded polyethylene tubing, the latter is formed again into a tight helix and heated to shrink the tubing down upon the core.

A more thorough understanding of our invention may be gained from a study of the appended drawing.

In the drawing:

FIGURE 1 shows a retractile cord made to our invention.

FIGURE 2 shows a diagrammatic representation of our method of making a retractile cord.

FIGURE 3 shows a diagrammatic representation of another method of making a retractile cord.

FIGURE 4 shows a sectional view of shrinkable tubing before expansion.

In FIGURE 1 a retractile cord 10 has a core 11 comprised of insulated conductors 12, 13, 14 that have been twisted together in the usual manner to increase their flexibility. Our invention is not limited to cores comprising three conductors nor, for that matter, to cores that have electrically conducting members. When used for a dog leash, for example, the core may be a fiberglass rope selected for its high tensile strength. The core 11 is surrounded by a tubular jacket 16 comprised of tubing that was originally formed by extrusion at a diameter smaller than the diameter of the core 11. Polyvinyl chloride may be used for the jacket 16 and a suitable shrinkable tubing of this material is described in Patent No. 2,027,962. As an example of appropriate dimensions, when the diameter over the core 11 is 0.25 inch the jacket 16 is extruded to have an inside diameter, before stretching, of 0.16 inch and a wall thickness of 0.015 inch. It is stretched to .30 inch inside diameter before the core is inserted. The cord 10 is seen to be in the form of a tight helix made up of a plurality of turns 17.

Although the illustrated cord has a polyvinyl chloride jacket, jackets may be formed of other shrinkable materials such as neoprene, polyethylene, and silicone rubber blended with polyethylene such as that described in application Ser. No. 299,781. A neoprene composition suitable for the jacket 11 comprises:

| | Parts by weight |
|---|---|
| Neoprene | 100 |
| Carbon black | 35 |
| Butyl oleate | 22 |
| Magnesium silicate | 25 |
| Mineral wax | 2 |
| Polyethylene | 17 |
| Red lead oxide | 20 |
| Antioxidants | 4 |
| Accelerators | 2 |

A method of making the retractile cord 10 and other cords coming within the scope of our invention is shown in FIGURES 2 and 3. Here the strands 12, 13, 14 are paid from reels 18, 19, 20 into a strander 21 where the core 11 is taken up on a reel 22. A plastic extruder 23 extrudes tubing 24 having a bore diameter "d" (FIGURE 4) smaller than the diameter "D" (FIGURE 1) of the core 11. The tubing is heated and expanded in an apparatus 26 which is described in Patent No. 3,182,355 and has an internal perforated cylinder 27 of the size to which the outside diameter of the tubing 24 is to be expanded. Vacuum chambers 28, 29 communicating with the perforations in the cylinder 27, and a steam jacket 31 for heating the tubing to the required temperature for expanding, surrounds the cylinder 27. During the expansion, plugs 32, 33 prevent lengthwise movement of the tubing so that the expansion is only radial. This prevents the tubing from shrinking lengthwise on the core when the helix is later heated. While the vacuum is still applied to the chambers 28, 29 to keep the tubing expanded, the steam is shut off and cooling water is introduced through a valve 34 in the jacket 31. The core 11 is then pulled into the tubing 24, now expanded, by means of a lead wire 36, and the tubing is formed into a coil and, turn by turn, inserted into a metal heating cylinder 37. Other means of expanding shrinkable tubing are known and are included within the scope of our invention, and it is, of course, also within such scope to introduce the core 11 into the tubing before the latter has cooled, while it is still in the apparatus 26 or an equivalent expansion apparatus. The turns of tubing in the cylinder 37 form a helix 38 wherein the core 11 is seen to press outwardly against the wall of the tubing. Although we have shown the helix being formed within a cylinder it is also within the scope of our invention to form the helix 38 around a mandrel or to form a free helix. The helix might, in some embodiments, take the form of a flat spiral.

The cylinder 37 containing the helix 38 is next placed in an oven 39 where it is heated to shrink the tubing down snugly and in tension around the core 11. The cylinder is placed in the oven in a vertical position so that a light weight 40 may be applied to keep the turns tight as the tubing shrinks. In the oven 39 the tubing is prevented from shrinking to its original inside diameter "d" by the presence of the core 11 and thus remains under tension.

When the tubing 24 is comprised of a material such as polyethylene that can be provided with a "plastic memory" by irradiation, we find that a greater retractability can be induced into a thinner wall jacket by forming the tubing into a helix prior to its expansion. This method is shown in FIGURE 3 which is the same as the method of FIGURE 2 except for the additional steps of coiling and irradiating the tubing 24 and the step of heating the helix to straighten it out before it can be inserted into the apparatus 26. A coil 41 is formed by winding the unexpanded polyethylene tubing 42 around a mandrel 43. The coil 41 is then subjected to beta radiation of at least $3 \times 10^6$ rep by apparatus similar to that described in Patent No. 2,429,217. The coil 41 is slid off the mandrel 43 and heated to about 75° C. at which temperature the coil can be unwound and the straight tubing placed in the apparatus 26 between the plugs 32, 33 and expanded in the manner already described by the application of steam and vacuum. Thereafter the methods are the same for the precoiled as for the non-precoiled tubing except that in the case of the precoiled tubing care should be taken to form the side of the tubing that was originally compressed on the inside of the coil 41, also on the inside of a final helix 44.

In retractile cords made by conventional prior art methods it is known that the retractile properties are improved by reversing the pitch of the cord after its final formation and the same procedure is advantageously applied to the cords of our invention. That is, after the helix has cooled and been removed from the cylinder 37, it is twisted in a known manner to give the turns a right-hand lay instead of the left-hand lay shown in the drawing.

We have invented a new and useful article and method for which we desire an award of Letters Patent.

We claim:
1. A retractile cord comprising:
   (A) a flexible core and
   (B) a tubular elastic jacket surrounding said core,
       (a) said jacket having a diameter in the unstretched condition smaller than the diameter of said core, and
       (b) said jacket being under circumferential tension and gripping said core,
   (C) said cord being formed in the shape of a tight helix, having a plurality of adjacent turns, and
   (D) said cord substantially returning to its original tight helical shape upon the release of any tensional force spreading apart said turns, due to the tension in said jacket.
2. The retractile cord of claim 1 wherein said jacket comprises polyvinyl chloride.
3. The retractile cord of claim 1 wherein said jacket comprises neoprene.
4. The retractile cord of claim 1 wherein said jacket comprises silicone rubber and polyethylene.
5. The retractile cord of claim 1 wherein said core comprises at least one insulated electrical conductor.
6. The method of making a retractile cord comprising the steps of:
   (A) forming a flexible elongated core,
   (B) forming a length of heat shrinkable elastic tubing having a bore diameter smaller than the diameter of said core,
   (C) expanding said tubing at an elevated temperature to a bore diameter larger than the diameter of said core,
   (D) cooling said tubing while said tubing is expanded,
   (E) inserting said core into said tubing,
   (F) forming said tubing containing said core into a tight helix, and
   (G) heating said helix so as to shrink said tubing down upon said core.
7. The method of making a retractile cord comprising the steps of:
   (A) forming a flexible, elongated core,
   (B) forming a length of heat shrinkable elastic tubing having a bore diameter smaller than the diameter of said core,

(C) expanding said tubing at an elevated temperature to a bore diameter greater than the diameter of said core,
(D) cooling said tubing while said tubing is expanded,
(E) inserting said core in said tubing,
(F) forming said tubing containing said core into a tight helix,
(G) inserting said helix into a close-fitting heating cylinder, and
(H) heating said helix within said cylinder so as to shrink said tubing down upon said core.

8. The method of making a retractile cord comprising the steps of:
(A) forming a flexible, elongated core,
(B) extruding a length of polyethylene tubing having a bore diameter smaller than the diameter of said core,
(C) forming said tubing into a tight helix,
(D) irradiating said helix with beta radiation,
(E) straightening and expanding said tubing at an elevated temperature to a bore diameter greater than the diameter of said core,
(F) cooling said tubing while said tubing is expanded,
(G) inserting said core into said tubing,
(H) forming said tubing containing said core into a tight helix, and
(I) heating said helix so as to shrink said tubing down upon said core.

References Cited by the Examiner
UNITED STATES PATENTS 2,586,763   2/1952   Judisch.
3,093,344   6/1963   Kirkpatrick.

OTHER REFERENCES

"Shrunken Tubing Wraps Harnesses," published in Electronics, Apr. 8, 1960, pp. 86 and 88. Copy in Group 160, Class 161—Shrink Digest.

LEWIS H. MYERS, *Primary Examiner.*

D. L. CLAY, *Assistant Examiner.*